(12) United States Patent
Petrou et al.

(10) Patent No.: US 7,616,790 B2
(45) Date of Patent: Nov. 10, 2009

(54) HISTOLOGICAL ASSESSMENT OF NUCLEAR PLEOMORPHISM

(75) Inventors: Maria Petrou, Guildford (GB);
Anastasios Kesidis, Athens (GR);
Margaret Jai Varga, Malvern (GB);
Paul Gerard Ducksbury, Malvern (GB)

(73) Assignee: Qinetiq Limited (GB)

( * ) Notice: Subject to any disclaimer, the term of this patent is extended or adjusted under 35 U.S.C. 154(b) by 485 days.

(21) Appl. No.: 10/535,323

(22) PCT Filed: Nov. 13, 2003

(86) PCT No.: PCT/GB03/04910
§ 371 (c)(1),
(2), (4) Date: May 18, 2005

(87) PCT Pub. No.: WO2004/046994
PCT Pub. Date: Jun. 3, 2004

(65) Prior Publication Data
US 2006/0050947 A1 Mar. 9, 2006

(30) Foreign Application Priority Data
Nov. 21, 2002 (GB) .................................. 0227160.9

(51) Int. Cl.
*G06K 9/00* (2006.01)
*C12Q 3/00* (2006.01)
(52) U.S. Cl. ............................ 382/128; 382/168; 435/6
(58) Field of Classification Search .................. 382/100, 382/128, 129, 130, 131–133, 155, 162, 164, 382/165, 181, 194, 199, 203, 220, 224, 237, 382/254, 274, 276, 168; 356/456; 435/7.21, 435/6; 530/388.1; 702/19
See application file for complete search history.

(56) References Cited

U.S. PATENT DOCUMENTS

| 5,235,522 A | * | 8/1993 | Bacus .......................... 702/19 |
| 5,978,497 A | * | 11/1999 | Lee et al. ...................... 382/133 |
| 5,991,028 A | * | 11/1999 | Cabib et al. ................... 356/456 |
| 6,165,734 A | * | 12/2000 | Garini et al. ................. 435/7.21 |

(Continued)

FOREIGN PATENT DOCUMENTS

WO WO 99/08091 2/1999

OTHER PUBLICATIONS

Otsu, "A Threshold Selection Method from Gray-Level Histograms", IEEE, pp. 62-66 (1979).

(Continued)

*Primary Examiner*—Seyed Azarian
(74) *Attorney, Agent, or Firm*—McDonnell Boehnen Hulbert & Berghoff LLP

(57) ABSTRACT

A method of histological assessment of nuclear pleomorphism to identify potential cell nuclei divides image data into overlapping sub-images. It uses principal component analysis to derive monochromatic image data, followed by Otsu thresholding to produce a binary image. It removes image regions at sub-image boundaries, unsuitably small image regions and holes in relatively large image regions. It then reassembles the resulting sub-images into a single image. Perimeters (P) and areas (A) of image regions which are potential cell nuclei are determined and used in calculating nuclear shape factors $P^2/A$. Nuclear pleomorphism is assessed as relatively low, moderate or high according to whether predetermined shape factor thresholds indicate a mean cell nucleus shape factor for an image is relatively low, moderate or high.

29 Claims, 2 Drawing Sheets

Nuclear Pleomorphism Feature Detection

Figure 1:
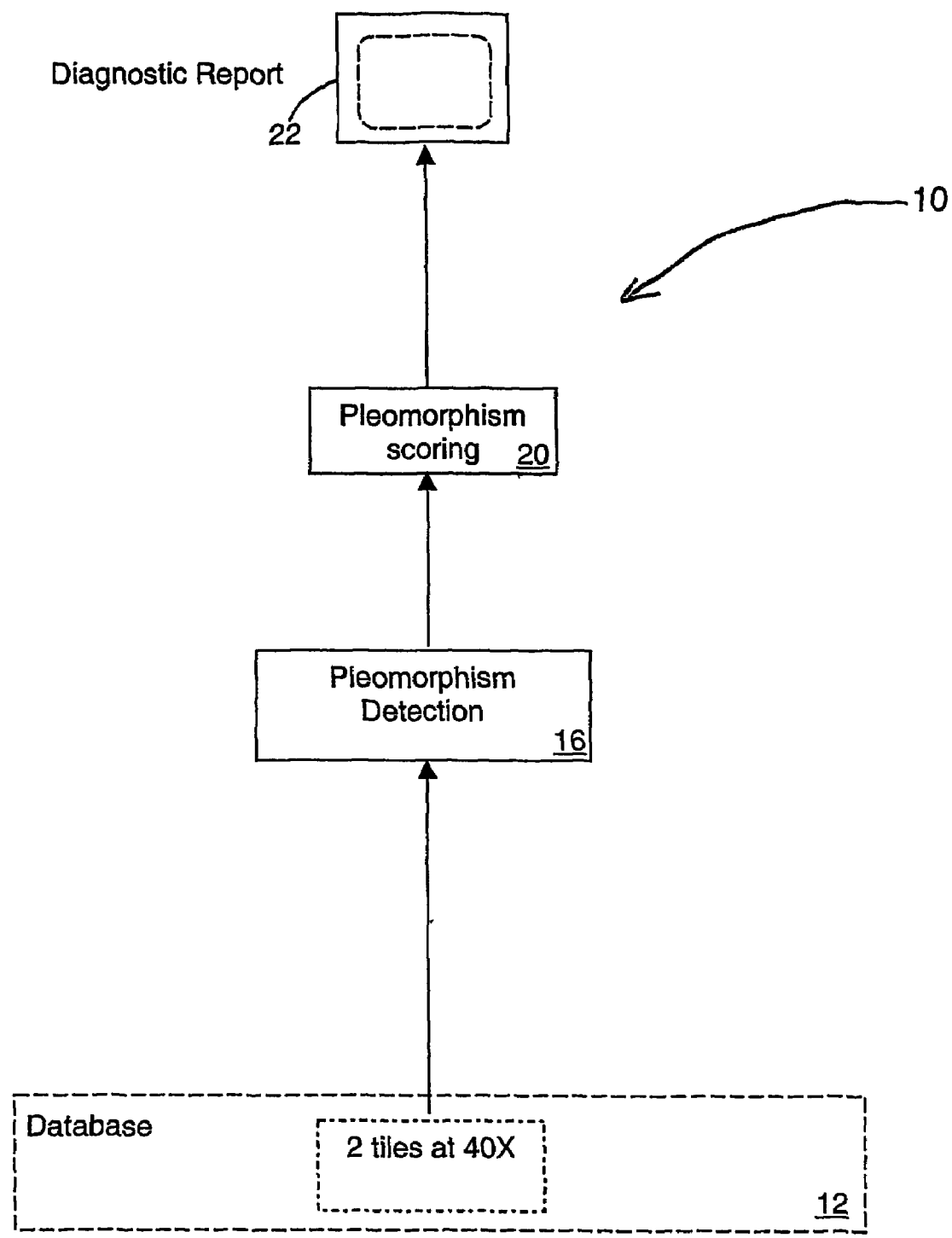

U.S. PATENT DOCUMENTS 6,930,175 B1 *  8/2005  Pasternack et al. ....... 530/388.1
7,144,701 B2 * 12/2006  Huang ........................... 435/6
2002/0164063 A1  11/2002  Heckman

OTHER PUBLICATIONS

Doudkine et al. "Nuclear Texture Measurements in Image Cytometry", Pathologica, pp. 286-299 (1995).

Murase et al., "Classification of Skin Tumor Using Image Processing", The Transactions of the Institute of Electrical Engineers of Japan, vol. 122C, No. 10, Oct. 14, 2002.

Partial Engish translation of Murase et al., "Classification of Skin Tumor Using Image Processing", The Transactions of the Institute of Electrical Engineers of Japan, vol. 122C, No. 10, Oct. 14, 2002.

* cited by examiner

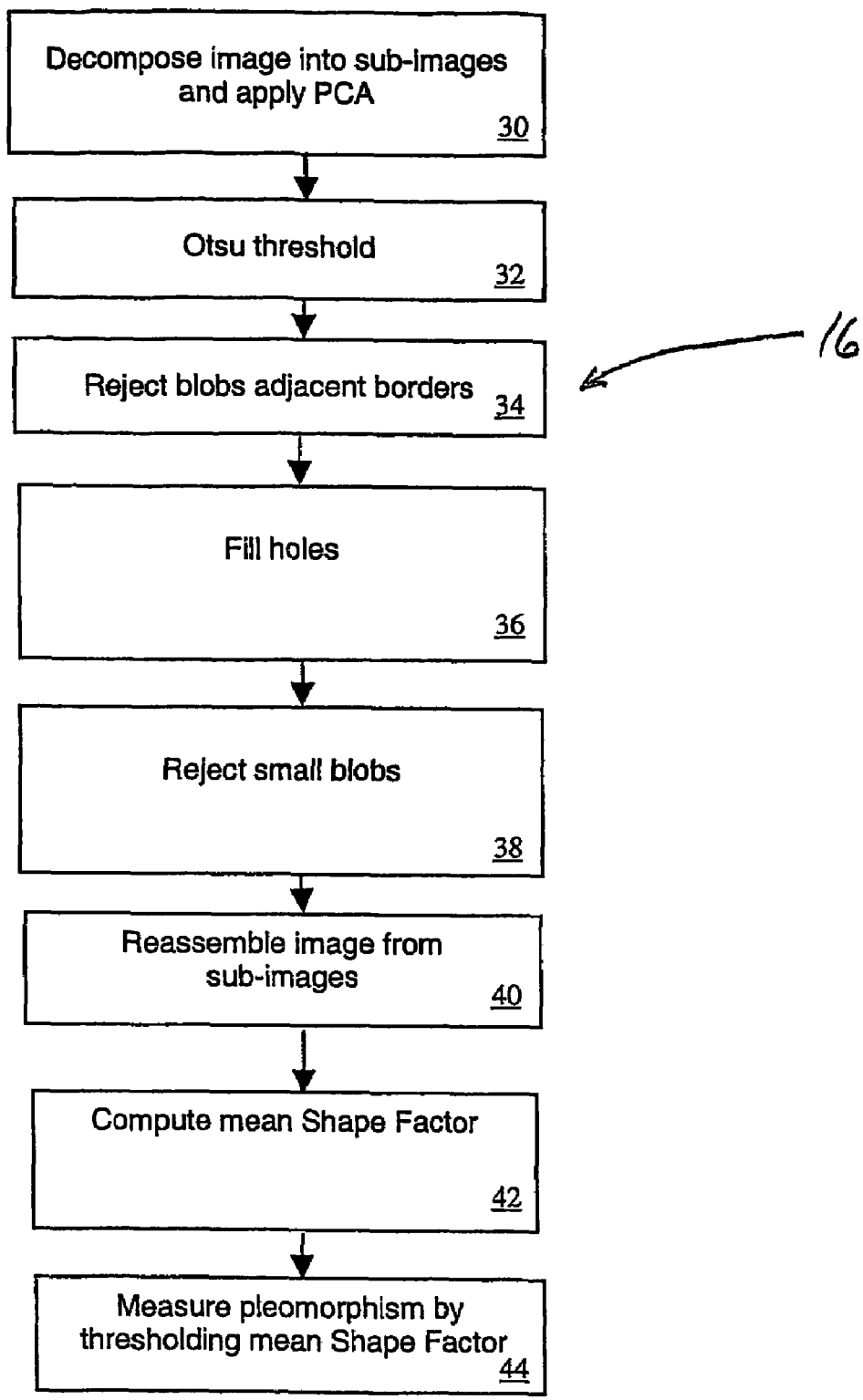
Figure 2 Nuclear Pleomorphism Feature Detection

HISTOLOGICAL ASSESSMENT OF NUCLEAR PLEOMORPHISM

This invention relates to a method, an apparatus and a computer program for histological assessment of nuclear pleomorphism: it is particularly (although not exclusively) relevant to assessment of histological images to provide clinical information on cancers such as breast cancer. The method is also relevant to other cancers, e.g. colon and cervical cancer as well as breast cancer.

Breast cancer is a common form of female cancer, and it occurs also in the male albeit to a lesser extent: once a lesion indicative of breast cancer has been detected, tissue samples are taken and examined by a histopathologist to establish a diagnosis, prognosis and treatment plan. However, pathological analysis of tissue samples is a time consuming and subjective process. It entails interpretation of images by human eye: it can be characterised by inconsistencies in observations of the same samples by different observers and even by the same observer at different times. For example, two different observers assessing images of the same tissue samples may give different opinions for a number of the images. Different opinions may arise in as many as 30% of the images. The problem is exacerbated by heterogeneity, i.e. complexity of some tissue sample features.

There is a need to provide an objective measurement of the degree of nuclear pleomorphism to support the pathologist's diagnosis and the patient's treatment.

The present invention provides a method of, histological assessment of nuclear pleomorphism by identifying image regions potentially corresponding to cell nuclei in histological image data, characterised in that the method also includes thresholding the image data to render it binary, determining perimeters and areas of identified image regions, calculating image region shape factors from the perimeters and areas and assessing pleomorphism from the shape factors' statistical parameters.

The invention provides the advantage that it is an objective measurement of pleomorphism to inform a pathologist's diagnosis and patient treatment.

The shape factors' statistical parameters may comprise at least one of their mean, weighted mean, median, mode, maximum and minimum. The step of thresholding the imaged data may be Otsu thresholding.

The step of assessing pleomorphism may determine pleomorphism as being relatively low, moderate or high according to whether the mean or median of the shape factors is relatively low, moderate or high respectively. A shape factor S for an image region potentially corresponding to a cell nucleus may be given by $S=kP^2/A$, where k is a constant, P is image region perimeter and A is image region area, and a mean shape factor $S_m$ for a set of image regions potentially corresponding to cell nuclei may be thresholded as $S_m \leq 30k$ (low), $30k < S_m \leq 35k$ (moderate) and $S_m > 35k$ (high) corresponding to pleomorphism being relatively low, moderate or high respectively.

The step of thresholding the image data to render it binary may be preceded by transforming colour image data into greyscale image data with improved image definition compared to an individual red green or blue plane in colour image data, and the step of thresholding the image data is then carried out upon the greyscale image data. The step of transforming colour image data into greyscale image data may be carried out by Principal Component Analysis (PCA) in which the greyscale image data is a first principal component.

The step of identifying image regions potentially corresponding to cell nuclei in histological image data includes filtering the image data to overwrite regions which are not of interest using a filtering process which does not appreciably affect image region perimeter. The overwriting step may include setting relatively small image regions to a background pixel value and setting hole pixels in relatively larger image regions to a non-hole image region pixel value.

Image regions potentially corresponding to cell nuclei in histological image data may be identified by a procedure including:
 a) dividing the image data into overlapping sub-images,
 b) applying PCA to each sub-image to provide a respective greyscale sub-image, and
 c) removing from the greyscale sub-images:
  i) image regions touching or intersecting sub-image boundaries,
  ii) unsuitably small image regions, and
  iii) holes in relatively large image regions, and
 d) reassembling the sub-images into a binary image.

In another aspect, the present invention provides an apparatus for histological assessment of nuclear pleomorphism by identifying image regions potentially corresponding to cell nuclei in histological image data, characterised in that the apparatus incorporates a computer programmed to threshold the image data to render it binary, determine perimeters and areas of identified image regions, calculate image region shape factors from the perimeters and areas and assess pleomorphism from the shape factors' statistical parameters.

In a further aspect, the present invention provides computer software for use in histological assessment of nuclear pleomorphism and having instructions for controlling a computer to identify image regions potentially corresponding to cell nuclei in histological image data, characterised in that the software also has instructions for controlling a computer to threshold the image data to render it binary, determine perimeters and areas of identified image regions, calculating image region shape factors from the perimeters and areas and assess pleomorphism from the shape factors' statistical parameters.

The computer apparatus and computer software aspects of the invention may have preferred features equivalent to corresponding method aspects of the invention.

In order that the invention might be more fully understood, embodiments thereof will now be described, by way of example only, with reference to the accompanying drawings, in which:

FIG. 1 is a block diagram of a procedure for measuring pleomorphism to assist in formulating diagnosis and treatment; and FIG. 2 is a block diagram showing in more detail pleomorphism feature detection in accordance with the invention for use in the procedure of FIG. 1.

A procedure 10 for the assessment of tissue samples in the form of histopathological slides of carcinomas of the breast is shown in FIG. 1. This drawing illustrates processes which measure degree of pleomorphism for use in assessment of patient condition.

The procedure 10 employs a database 12, which maintains digitised image data obtained from histological slides as will be described later. Sections are taken (cut) from breast tissue samples (biopsies) and placed on respective slides. Slides are stained using the staining agent haemotoxylin & eosin (H&E). H&E is a very common stain for delineating tissue and cellular structure. Tissue stained with H&E is used to assess pleomorphism.

Nuclear pleomorphism is a measurement of degree of variability in shape of the nucleus of tumour cells within tissue. In normal tissue, cell nuclei have a regular structure in terms of shape and size, whereas nuclei of cancer cells can become larger and irregularly shaped, with a marked variation in shape and size.

In a prior art manual procedure, a clinician places a slide under a microscope with magnification of 40× and examines a region of it (often referred to as a tile) for indications of the degree of pleomorphism. This manual procedure requires a pathologist subjectively to assess unusual size and shape of cell nuclei in a tissue sample. The values obtained in this way are combined to give a single measurement for use in diagnosis. The process of the invention replaces the prior art subjective procedure with an objective procedure.

In the present example, image data were obtained from histological slides by a pathologist using Zeiss Axioskop microscope with a Jenoptiks Progres 3012 digital camera. Image data from each slide is a set of digital images obtained at a linear magnification of 40 (i.e. 40× linear, 1600× area), each image being an electronic equivalent of a tile. Images obtained by other microscopes and cameras can also be used.

To obtain images, a pathologist scans the microscope over a slide, and at 40× magnification selects regions of the slide which appear to be most promising in terms of pleomorphism assessment. Each of these regions is then photographed using the microscope and camera mentioned above, and this produces for each region a respective digitised image in three colours, red, green and blue (R, G & B). Three intensity values are obtained for each pixel in a pixel array to provide an image as a combination of R, G and B image planes. This image is stored temporarily at 12 for later use. Two tiles are required for pleomorphism measurement by a process 16: the results of the process 16 are converted into a measurement at 20 for input to a diagnostic report at 22.

Referring now to FIG. 2, the pleomorphism feature detection process 16 is shown in more detail. It is carried out for each of the two tiles or digitised images (raw (RGB) input images) mentioned above, and will be described for one such image. At a first stage 30 the raw (RGB) input image is separated into overlapping windows of size 128×128 pixels. In each window, 64 pixels overlap with 64 pixels of respective neighbouring windows in both horizontal and vertical directions. For example, an image of 256×256 would give a 3×3 set of 128×128 overlapping windows: thus, each window overlaps half of each of its row and column neighbours. To each window a technique referred to as "Principal Component Analysis" (PCA, Karhunen-Loeve Transform) is applied. PCA is a standard mathematical technique described by Jollie I. T., 'Principal Component Analysis', Springer series in statistics, Springer Verlag, 1986. It is also described by Jackson J. E., 'A User Guide to Principal Components', John Wiley & Sons,1991, pp 1-25.

PCA is a transformation into a domain or representation in which data is more easily exploited or understood (e.g. separable or classified into different classes or categories). It is a standard mathematical technique for transforming a set of (possibly) correlated variables into a smaller number of uncorrelated variables called principal components. The principal components are associated with respective eigenvalues: a first principal component has the largest eigenvalue and accounts for as much of the variables' variability as possible compared to other principal components. In this first principal component, image definition, contrast and characteristics are improved compared to R, G or B image planes In colour image data. Only the first principal component is used in this example, but alternatively a linear combination of all the principal components can be used and might be appropriate if their eigenvalues were not very different.

There are other transformations (analysis techniques or filters) which could also be used, and which have particular characteristics (e.g. linear or non-linear, exploiting data characteristics, means, variances etc. in different ways). Neural networks/adaptive networks and related techniques are also used to implement such transformations.

PCA involves calculating a covariance matrix and solving for its eigenvalues and eigenvectors. The image is now treated as being arranged as an N×3 matrix, i.e. having N pixels and three planes (R, G and B). The covariance matrix is calculated using a formula for its matrix elements $C_{i,j}$ as follows:

$$C_{i,j} = \frac{\sum_{k=1}^{N}(x_k - \mu_x)(y_k - \mu_y)}{N-1} \quad (1)$$

where $C_{i,j}$ is the covariance of variable i with variable $x_k$ and $y_k$ are the ith and jth feature values of the kth object, $\mu_x$ is the mean of all N values of $x_k$, $\mu_y$ is the mean of all N values of $y_k$. The covariance matrix is 3×3 and PCA yields three eigenvectors: the eigenvectors are treated as a 3×3 matrix, which is used to multiply the transpose of the N×3 image matrix to produce a product matrix. The product matrix has an N×1 first column which is the first principal component, which may be considered as the most important component: it is the component with the maximum eigenvalue, and it provides a greyscale sub-image (one pixel value for each of N pixels) with a maximum range of information compared to equivalents associated with other components. PCA therefore produces monochromatic or greyscale image data. It is carried out for each of the overlapping windows defined above, and each provides a respective first principal component and greyscale sub-image of size 128×128 pixels.

At 32, a thresholding technique referred to as "Otsu" is applied to each sub-image resulting from 30 to transform it into a respective binary sub-image. Otsu is a standard thresholding technique published by Otsu N., 'A thresholding selection method from grey level histograms', IEEE Trans Systems, Man & Cybernetics, vol. 9, 1979, pp 62-66. The Otsu threshold selection method aims to minimise for two classes a ratio of within-class variance to between-class variance: i.e. the higher the variance between classes the better the separation. Otsu is a particularly preferred thresholding technique. In the present example the two classes are a below-threshold class (pixel value 0) and an above-threshold class (pixel value 1), so Otsu thresholding converts each greyscale sub-image to a binary sub-image containing a set of blobs: here blobs are image regions (objects in the image) each of which is a respective group of mutually contiguous pixels all having value 1 and possibly corresponding to a cell nucleus. The blobs may have holes (pixel value 0) in them.

At 34 all blobs that touch or are intersected by sub-image boundaries are removed. Thus, if at any pixel a blob meets a border it is removed by setting its pixels to a background pixel value. This is because boundaries meeting blobs produce artificially straight blob edges which can give misleading results later. Because of sub-image overlap, a blob which appears partly in one image may appear wholly in another sub-image and so is not necessarily lost.

At 36 the sub-images from 34 are inverted (pixel value 0 changes to 1 and vice versa) and connected component labelling (CCL) is applied to remove holes in blobs. CCL is a known image processing technique (sometimes referred to as 'blob colouring') published by Klette R., Zamperoniu P., 'Handbook of Image Processing Operators', John Wiley & Sons, 1996, and Rosenfeld A., Kak A. C., 'Digital Picture Processing', vols. 1 & 2, Academic Press, New York, 1982. CCL gives a respective label to each group of contiguous pixels of pixel value 1. Because of the inversion, areas of pixel value 1 which are labelled in CCL are now holes within blobs together with background pixels. Holes within each blob are now removed (filled) by setting their pixels to the value of other pixels of the blob. Background pixels are left unchanged.

At 38, the sub-images from 36 are inverted once more and CCL is applied again: due to this second inversion, areas labelled by CCL are now filled blobs within each sub-image. CCL has a facility for removal of blobs with areas smaller than a user-defined minimum area threshold. In this example, using 40× magnification, the minimum area threshold in this example is 400 pixels: all blobs with areas less than 400 pixels are therefore rejected and merged into the background by setting their pixels to a background value (0). Remaining blobs with areas of at last 400 pixels are accepted for further processing as set of labelled blobs. CCL also gives for each remaining blob its perimeter P and area A in number of pixels in each case.

After stages 30 to 38, each sub-image is clear of unwanted small blobs: all remaining blobs have been filled to remove holes within them, so they consist of pixels which are all the same value. The advantage of stages 30 to 38 is that they provide spatial filtering but do not appreciably affect perimeter shapes of blobs, which is, important for subsequent processing. Such filtering is not essential but it is helpful to reduce processing burden At 40, the sub-images output from step 38 are reassembled into a new binary image: the new binary image has the same size as the original raw (RGB) input image, and contains only blobs that will be assessed in subsequent pleomorphism processing. Steps 30 to 40 are pre-processing steps which identify a set of blobs within the original raw (RGB) input image: each of these blobs should now correspond to a cell nucleus. At 42 a statistical analysis is applied. A shape factor $$S = \frac{P^2}{A}$$

is calculated for each blob from blob perimeter P and area A obtained in CCL at 38. S could also be a multiple or fraction of $$\frac{P^2}{A}$$

were this to be convenient, and other functions of P and A could be used to indicate shape. The value of S increases with increasing irregularity of blob shape, it is $4\pi$ (~12.57) for a perfect circle. A mean value $S_m$ of S is calculated for the complete image by adding the S values of all blobs in the image together and dividing by their number. $S_m$ is thresholded to derive a measure of the pleomorphism of the original raw (RGB) input image: $S_m$ thresholds were derived from an analysis of a test set of 200 pleomorphism images. There are three threshold categories, $S_m \leq 30$ (low), $30 < S_m < 35$ (moderate) and $S_m > 35$ (high) with pleomorphism scores 1, 2 and 3 respectively as tabulated below. These thresholds are for $$S = \frac{P^2}{A}:$$

other shape factor expressions may need different thresholds.

| $S_m$: Mean Value of Blob Shape Factor | Pleomorphism Score |
|---|---|
| Low, $S_m \leq 30$ | 1 |
| Moderate, $30 < S_m \leq 35$ | 2 |
| High, $S_m > 35$ | 3 |

For $$S = \frac{kP^2}{A},$$

where k is a constant, the three threshold categories become $S_m < 30k$ (low), $30k < S_m \leq 35k$ (moderate) and $S_m > 35k$ (high).

$S_m$ may be calculated by other procedures. It might simply be the median of an odd number of values of S, or the average of two central values of an even number-of values of S. It is also possible to use the maximum or minimum of a series of values of S, or with a largely single mode distribution of values of S, the mode value. However, this will affect thresholds. A weighted mean $S_{wm}$ could be calculated by multiplying each value of S by a weight factor $w_i$, adding the weighted values and dividing their sum by the sum of the weights; each weight would indicate the probability of the associated blob or cell nucleus giving a reliable indication of pleomorphism: i.e.

$$S_{wm} = \frac{\sum_i w_i S_i}{\sum_i w_i} \qquad (2)$$

The above discussion shows that there are a number of ways an overall shape factor can be determined from the statistical characteristics of a set of shape factors, eg. their mean, weighted mean, median, mode, maximum and minimum may all be used individually.

At 20 the score for the nuclear pleomorphism measurement has a value 1, 2 or 3 and a respective score is obtained for each of the input tiles. The maximum of these two scores is taken as the overall pleomorphism score.

| Measurement of Nuclear Pleomorphism | Meaning | Points |
|---|---|---|
| Uniform | Minimal increase in size and variation in size compared to normal cell nuclei, i.e. nuclei are relatively small and uniform in size. | 1 |
| Moderate Variation | Moderate increase and variation in size and shape with vesicular nuclei. | 2 |
| Marked Variation | Marked variation in size and shape with vesicular nuclei. | 3 |

The measurement of nuclear pleomorphism may be combined with others obtained for mitosis and tubules by different methods to derive an overall grading referred to in medicine as a "Bloom and Richardson grading" or modified versions of this grading: it is used by clinicians as a measure of cancer status.

The examples given in the foregoing description for calculating results can clearly be evaluated by an appropriate computer program on a carrier medium and running on a conventional computer system. Such a program is straightforward for a skilled programmer to implement without requiring invention because the procedures are well known, and it will therefore not be described further.

The invention claimed is:

1. A method of histological assessment of nuclear pleomorphism by identifying image regions comprising respective groups of contiguous pixels and potentially corresponding to cell nuclei in histological image data, the method including using computer apparatus to carry out the steps of:
   a) thresholding the image data to render it binary with identified image regions and background distinguished from one another by association with different binary digits,
   b) determining perimeters and areas of identified image regions,
   c) calculating image region shape factors from the perimeters and areas, and
   d) assessing nuclear pleomorphism from the shape factors' statistical parameters.

2. A method according to claim 1 wherein the shape factors' statistical parameters comprise at least one of their mean, weighted mean, median, mode, maximum and minimum.

3. A method according to claim 1 wherein the step of thresholding the imaged data is Otsu thresholding.

4. A method according to claim 1 wherein the step of thresholding the image data to render it binary is preceded by transforming colour image data into greyscale image data with improved image definition compared to an individual red green or blue plane in colour image data, and the step of thresholding the image data is carried out upon the greyscale image data.

5. A method according to claim 4 wherein the step of transforming colour image data into greyscale image data is carried out by Principal Component Analysis (PCA) in which the greyscale image data is a first principal component.

6. A method of histological assessment of nuclear pleomorphism by identifying image regions potentially corresponding to cell nuclei in histological image data, the method including using computer apparatus to carry out the steps of:
   a) thresholding the image data to render it binary,
   b) determining perimeters and areas of identified image regions,
   c) calculating image region shape factors from the perimeters and areas, and
   d) assessing nuclear pleomorphism as being relatively low, moderate or high according to whether the mean or median of the shape factors is relatively low, moderate or high respectively.

7. A method according to claim 6 wherein a shape factor S for an image region potentially corresponding to a cell nucleus is given by $$S = \frac{kP^2}{A},$$

where k is a constant, P is image region perimeter and A is image region area, and a mean shape factor $S_m$ for a set of image regions potentially corresponding to cell nuclei is thresholded as $S_m \leq 30k$ (low), $30k < S_m \leq 35k$ (moderate) and $S_m > 35k$ (high) corresponding to pleomorphism being relatively low, moderate or high respectively.

8. A method of histological assessment of nuclear pleomorphism by identifying image regions potentially corresponding to cell nuclei in histological colour image data, the method including using computer apparatus to carry out the steps of:
   a) decomposing colour image data into a set of sub-images each of which overlaps half of each of its neighbours,
   b) applying Principal Component Analysis (PCA) to each sub-image to obtain greyscale sub-images as first principal components, in order to provide improved image definition compared to an individual red green or blue plane in the colour image data,
   c) removing from each sub-image regions at sub-image edges potentially corresponding to cell nuclei,
   d) thresholding the greyscale image data to render it binary, and
   e) determining perimeters and areas of identified image regions, calculating image region shape factors from the perimeters and areas and assessing nuclear pleomorphism from the shape factors' statistical parameters.

9. A method of histological assessment of nuclear pleomorphism by identifying image regions potentially corresponding to cell nuclei in histological image data, the method including using computer apparatus to carry out the steps of:
   a) filtering the image data to overwrite regions which are not of interest using a filtering process which does not appreciably affect image region perimeter,
   b) thresholding the image data to render it binary,
   c) determining perimeters and areas of identified image regions,
   d) calculating image region shape factors from the perimeters and areas, and
   e) assessing nuclear pleomorphism from the shape factors' statistical parameters.

10. A method according to claim 9 wherein the step of overwriting regions which are not of interest includes setting relatively small image regions to a background pixel value and setting hole pixels in relatively larger image regions to a non-hole image region pixel value.

11. A method of histological assessment of nuclear pleomorphism by identifying image regions potentially corresponding to cell nuclei in histological image data, the method including using computer apparatus to carry out the steps of:
   a) dividing the image data into overlapping sub-images, applying PCA to each sub-image to provide a respective greyscale sub-image and removing from the greyscale sub-images:
      i) image regions touching or intersecting sub-image boundaries,
      ii) unsuitably small image regions, and
      iii) holes in relatively large image regions,
   b reassembling the sub-images into a binary image by thresholding,
   c) determining perimeters and areas of identified image regions, and
   d) calculating image region shape factors from the perimeters and areas and assessing nuclear pleomorphism from the shape factors' statistical parameters.

12. Apparatus for histological assessment of nuclear pleomorphism by identifying image regions comprising respective groups of contiguous pixels and potentially corresponding to cell nuclei in histological image data, the apparatus incorporating a computer programmed to threshold the image data to render it binary with identified image regions and background distinguished from one another by association with different binary digits, determine perimeters and areas of identified image regions, calculate image region shape factors from the perimeters and areas and assess nuclear pleomorphism from the shape factors' statistical parameters.

13. Apparatus according to claim 12 wherein the shape factors' statistical parameters comprise at least one of their mean, weighted mean, median, mode, maximum and minimum.

14. Apparatus according to claim 12 wherein the computer is programmed to threshold the image data using Otsu thresholding.

15. Apparatus according to claim 12 wherein the computer is programmed to implement a transformation of colour image data into greyscale image data with improved image definition compared to an individual red green or blue plane in colour image data, and to implement such transformation prior to thresholding the image data to render it binary, and the computer is also programmed to carry out thresholding of the image data using the greyscale image data.

16. Apparatus according to claim 15 wherein the computer is programmed to transform colour image data into greyscale image data using PCA in which the greyscale image data is a first principal component.

17. Apparatus for histological assessment of nuclear pleomorphism by identifying image regions potentially corresponding to cell nuclei in histological image data, the apparatus incorporating a computer programmed to threshold the image data to render it binary, determine perimeters and areas of identified image regions, calculate image region shape factors from the perimeters and areas and to assess nuclear pleomorphism as being relatively low, moderate or high according to whether the mean or median of the shape factors is relatively low, moderate or high respectively.

18. Apparatus according to claim 17 wherein the computer is programmed to determine a shape factor S for an image region potentially corresponding to a cell nucleus is given by $$S = \frac{kP^2}{A},$$

where k is a constant, P is image region perimeter and A is image region area, and the computer is also programmed to determine a mean shape factor $S_m$ for a set of image regions potentially corresponding to cell nuclei, to threshold the mean shape factor as $S_m \leq 30k$ (low), $30k<S_m \leq 35k$ (moderate) and $S_m>35k$ (high) and to indicate pleomorphism being relatively low, moderate or high respectively.

19. Apparatus for histological assessment of nuclear pleomorphism by identifying image regions potentially corresponding to cell nuclei in histological colour image data, the apparatus incorporating a computer programmed to:
  a) divide the colour image data into overlapping sub-images,
  b) apply Principal Component Analysis (PCA) to the sub-images to obtain greyscale sub-images as first principal components, in order to provide improved image definition compared to an individual red green or blue plane in the colour image data,
  c) remove from the greyscale sub-images:
    i) image regions touching or intersecting sub-image boundaries,
    ii) unsuitably small image regions, and
    iii) holes in relatively large image regions,
  d) reassemble the sub-images into a binary image by thresholding,
  e) determine perimeters and areas of identified image regions, and
  f) calculate image region shape factors from the perimeters and areas and assessing nuclear pleomorphism from the shape factors' statistical parameters.

20. Apparatus for histological assessment of nuclear pleomorphism by identifying image regions potentially corresponding to cell nuclei in histological image data, the apparatus incorporating a computer is programmed to threshold the image data to render it binary, set relatively small image regions to a background pixel value and to set hole pixels in relatively larger identified image regions to a non-hole image region pixel value, determine perimeters and areas of identified image regions, calculate image region shape factors from the perimeters and areas and assess nuclear pleomorphism from the shape factors' statistical parameters.

21. A computer software product comprising a computer readable hardware medium containing computer readable instructions for use in histological assessment of nuclear pleomorphism for controlling a computer to identify image regions comprising respective groups of contiguous pixels and potentially corresponding to cell nuclei in histological image data, the software product also having computer readable instructions for controlling a computer to threshold the image data to render it binary with identified image regions and background distinguished from one another by association with different binary digits, determine perimeters and areas of identified image regions, calculating image region shape factors from the perimeters and areas and assess nuclear pleomorphism from the shape factors' statistical parameters.

22. A computer software product according to claim 21 wherein the shape factors' statistical parameters comprise at least one of their mean, weighted mean, median, mode, maximum and minimum.

23. A computer software product according to claim 21 wherein the computer readable instructions include instructions for controlling a computer to threshold the imaged data using Otsu thresholding.

24. A computer software product according to claim 21 wherein the computer readable instructions are also for controlling a computer so that before thresholding the image data to render it binary such computer will transform colour image data into greyscale image data with improved image definition compared to an individual red green or blue plane in colour image data, and subsequently such computer will implement thresholding of the image data using the greyscale image data.

25. A computer software product according to claim 24 wherein the computer readable instructions are also for controlling a computer to transform colour image data into greyscale image data by PCA in which the greyscale image data is a first principal component.

26. A computer software product according to claim 21 wherein the computer readable instructions are also for setting relatively small image regions to a background pixel value and for setting hole pixels in relatively larger image regions to a non-hole image region pixel value.

27. A computer software product comprising a computer readable medium containing computer readable instructions for use in histological assessment of nuclear pleomorphism for controlling a computer to identify image regions potentially corresponding to cell nuclei in histological image data, wherein the computer readable instructions being for controlling a computer to determine nuclear pleomorphism as being relatively low, moderate or high according to whether the mean or median of the shape factors is relatively low, moderate or high respectively.

28. A computer software product according to claim 27 wherein the computer readable instructions are also for controlling a computer to:
  a) determine a shape factor S for an image region potentially corresponding to a cell nucleus given by $$S = \frac{kP^2}{A},$$

where k is a constant, P is image region perimeter and A is image region area,
  b) threshold a mean shape factor $S_m$ for a set of image regions potentially corresponding to cell nuclei as $S_m \leqq 30k$ (low), $30k < S_m \leqq 35k$ (moderate) and $S_m > 35k$ (high) and
  c) to indicate nuclear pleomorphism being relatively low, moderate or high respectively.

29. A computer software product comprising a computer readable medium containing computer readable instructions for use in histological assessment of nuclear pleomorphism by identifying image regions potentially corresponding to cell nuclei in histological image data, the computer readable instructions being for controlling a computer to:
  a) decompose colour image data into a set of sub-images each of which overlaps half of each of its neighbours,
  b) apply Principal Component Analysis (PCA) to each sub-image to obtain greyscale sub-images as first principal components, in order to provide improved image definition compared to an individual red green or blue plane in the colour image data,
  c) remove from each greyscale sub-image:
    i) image regions touching or intersecting sub-image boundaries,
    ii) unsuitably small image regions, and
    iii) holes in relatively large image regions,
  d) reassemble the sub-images into a binary image by thresholding,
  e) determine perimeters and areas of identified image regions, and
  f) calculate image region shape factors from the perimeters and areas and assessing nuclear pleomorphism from the shape factors' statistical parameters.

* * * * *

UNITED STATES PATENT AND TRADEMARK OFFICE
CERTIFICATE OF CORRECTION

PATENT NO. : 7,616,790 B2
APPLICATION NO. : 10/535323
DATED : November 10, 2009
INVENTOR(S) : Petrou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this

Nineteenth Day of October, 2010

David J. Kappos
*Director of the United States Patent and Trademark Office*